> United States Patent Office 3,845,126
Patented Oct. 29, 1974

3,845,126
BENZALDOXIME DERIVATIVES
Raymond Giraudon, Val de Marne, and Jean Metivier, Seine, France, assignors to Rhone-Poulenc S.A.
No Drawing. Filed Sept. 25, 1967, Ser. No. 670,432
Claims priority, application France, Sept. 29, 1966, 78,184
Int. Cl. C07c 131/00
U.S. Cl. 260—566 AE       7 Claims

ABSTRACT OF THE DISCLOSURE

Benzaldoxime derivatives of the formula:

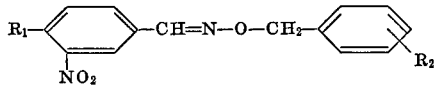

wherein $R_1$ represents hydrogen or alkyl of 1 through 3 carbon atoms, and

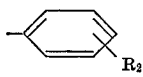

represents phenyl or phenyl carrying at least one member of the class consisting of halogen and alkyl of 1 through 3 carbon atoms, possess insecticidal and acaricidal properties.

---

This invention relates to new benzaldoxime derivatives, to processes for their preparation, and compositions containing them.

The new benzaldoxime derivatives of the present invention are those of the general formula:

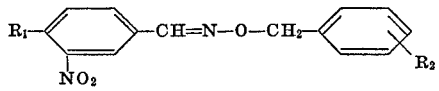   I wherein $R_1$ represents a hydrogen atom or an alkyl group containing 1 to 3 carbon atoms, and $R_2$ represents a hydrogen atom or one or more members of the class consisting of halogen atoms and alkyl groups containing 1 to 3 carbon atoms.

According to a feature of the invention, the aforesaid benzaldoxime derivatives are prepared by the reaction of an oxime of the formula:

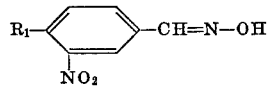   II wherein $R_1$ is as hereinbefore defined, with a benzyl halide of the formula:

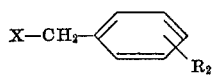   III wherein X represents a halogen atom and $R_2$ is as hereinbefore defined. The reaction is advantageously effected in an inert organic solvent, for example an alcohol, in the presence of a condensing agent, such as an alkali metal alkoxide, at a temperature between ambient temperature and the boiling point of the solvent employed.

The oxime starting materials of formula II are obtained by the usual methods for the preparation of oximes from corresponding aldehydes or ketones.

The benzyl halides of formula III are obtained, for example, by halogenation of toluene derivatives of the formula:

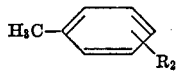   IV (wherein $R_2$ is as hereinbefore defined) by the usual methods for the halogenation of side chains of araliphatic hydrocarbons, or by halogenomethylation of benzene compounds of the formula:

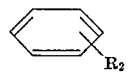   V wherein $R_2$ is as hereinbefore defined.

According to another feature of the invention, the benzaldoxime derivatives of formula I are prepared by the reaction of an oxyamine of the formula:

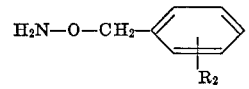   VI wherein $R_2$ is as hereinbefore defined, with a benzylaldehyde of the formula:

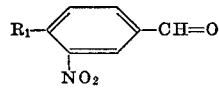   VII wherein $R_1$ is as hereinbefore defined. The reaction is effected in the absence or presence of an inert organic solvent, advantageously at a temperature of from 15° to 80° C., and optionally in the presence of an alkaline condensing agent.

The oxyamine starting materials of formula VI can be obtained by the method described by P. Mamalis et al., J. Chem. Soc., p. 229 (1960).

The benzaldoxime derivatives of formula I possess remarkable insecticidal properties, especially against *Musca domestica* and *Tribolium*, and acaricidal properties, particularly against *Tetranychus urticae*, with a marked ovicidal activity. Preferred benzaldoxime derivatives of the invention are O-(3-chlorobenzyl)-3-nitrobenzaldoxime and the corresponding 3-bromobenzyl, 2-fluorobenzyl and 3,4-dichlorobenzyl compounds and, more especially, O-(3-fluorobenzyl)-3-nitrobenzaldoxime, O - (2-methylbenzyl)-3-nitrobenzaldoxime and O-(2-chlorobenzyl)-4-methyl-3-nitrobenzaldoxime.

According to a further feature of the present invention there are provided pesticidal compositions containing at least one benzaldoxime derivative of formula I in association with one or more diluents compatible with the benzaldoxime and suitable for use in agricultural pesticidal compositions. Preferably, the compositions contain between 0.005 and 90% by weight of benzaldoxime. The compositions may be solid if there is employed a powdered solid compatible diluent such as talc, calcined magnesia, kieselguhr, tricalcium phosphate, powdered cork, absorbent charcoal, or a clay such as kaolin or bentonite. Instead of a solid diluent, there may be used a liquid in which the benzaldoxime is dissolved or dispersed. The compositions may thus take the form of suspensions, emulsions or solutions in organic or aqueous-organic media, for example aromatic hydrocarbons (such as toluene, xylene), acetophenone, o-dichlorobenzene or mineral, animal or vegetable oils, or mixtures of these diluents. The compositions in the form of suspensions, emulsions or solutions may contain wetting, dipersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When desired, emulsions of the benzaldoximes may be used in the form of self-emulsifying concentrates containing the active substance dissolved in the emulsifying agents or in a solvent containing an emulsifying agent compatible with the benzaldoxime and solvent, a simple addition of water to such concentrates producing compositions ready for use.

The solid compositions are preferably prepared by grinding the benzaldoxime with the solid diluent, or by impregnating the solid diluent with a solution of the benzaldoxime in a volatile solvent, evaporating the solvent, and if necessary grinding the product so as to obtain a powder, and may optionally incorporate a wetting or dispersing agent, for example of the types hereinbefore described.

The benzaldoxime derivatives of formula I are preferably employed for pesticidal purposes in a quantity of from 10 to 150 g. of active substance per hectolitre of water, but lower concentrations may also be used.

The following Examples illustrate the invention.

EXAMPLE I

A 2.3 N solution of potassium ethoxide in ethanol (21.6 cc.) is added to a suspension of 3-nitrobenzaldoxime (8.3 g.) in ethanol (50 cc.), and then a solution of 3-chlorobenzyl bromide (10.3 g.) in ethanol (20 cc.) is added dropwise to the limpid solution obtained during the course of about 10 minutes. When the exothermic reaction is complete, the mixture is heated under reflux for 2 hours. After cooling, the potassium bromide precipitate is filtered off. The solvent is evaporated, and the residual oil (15 g.) is distilled under reduced pressure to yield O-(3-chlorobenzyl)-3-nitrobenzaldoxime (10.2 g.), boiling at 200–205° C./0.2 mm. Hg with a melting point (capillary) of 42° C.

3-Chlorobenzyl bromide (boiling point 117–118° C./20 mm. Hg) employed as starting material is prepared by bromination of 3-chlorotoluene.

The products of formula I specified in the following Table, in which the position of substituents on the benzene rings is indicated, were prepared by the procedure described in the foregoing Example starting with appropriate compounds of formulae II and III.

| —$R_1$ | —$R_2$ | M.P. or B.P. (° C.) |
|---|---|---|
| —H | 3-(—Br) | M.P., 84 |
| —H | 2-(—F) | B.P., 190–195/0.2 mM. Hg |
| —H | 3-(—Cl), 4-(—Cl) | M.P., 97 |
| —H | 2-(—CH$_3$) | M.P., 62–64 |
| —H | 3-(—F) | M.P., 43–44 |
| —CH$_3$ | 2-(—Cl) | M.P., 56–58 |

EXAMPLE II

To 20 g. of O-(3-chlorobenzyl)-3-nitrobenzaldoxime are added 5 g. of a condensation product of octylphenol and ethylene oxide in the ratio of 10 molecules of ethylene oxide per molecule of octylphenol, and a mixture of equal volumes of toluene and acetophenone to make the volume up to 100 cc.

After suitable dilution with water, the solution obtained is used to destroy acarids. Depending on the desired effect, concentrations of 10 to 150 g. of active material per hectolitre give good results.

EXAMPLE III 400 g. of kaolin, 100 g. of ground gum arabic and 100 g. of calcium lignosulphite are added to 400 g. of O-(3,4-dichlorobenzyl)-3-nitrobenzaldoxime. After grinding and screening, the resulting powder, after dilution with water at the rate of 250 g. of powder per 100 litres of water, is used to protect plants against attack by acarids.

The acaricidal activity of benzaldoxime derivatives of general formula I is demonstrated by the following test:

Cotyledonous leaves of bean plants are dipped for 10 seconds in the emulsions to be studied. After drying, they are infested with red spiders. The fatalities are recorded 4 days after introducing the parasites.

The emulsifiable solutions used have the following composition:

| | | |
|---|---|---|
| Active product | g | 1 |
| Cemulsol C–105 | cc | 0.2 |
| Scurol O | cc | 0.2 |
| o-Dichlorobenzene | cc | 1 |
| Acetophenone sufficient to make up to 5 cc. | | |

Aqueous emulsions containing 0.2%, 0.1% and 0.05% of benzaldoxime derivatives are then prepared.

The results obtained are given in the following table.

| | | Percent of fatalities | | |
|---|---|---|---|---|
| —$R_1$ | —$R_2$ | 0.05% | 0.1% | 0.2% |
| —H | 3-(—Cl) | 40 | 95 | 100 |
| —H | 3-(—Br) | 70 | 90 | 95 |
| —H | 2-(—F) | 75 | 90 | 100 |
| —H | 3-(—Cl), 4-(—Cl) | 100 | 100 | 100 |
| —H | 2-(—CH$_3$) | 40 | 95 | 100 |
| —H | 3-(—F) | 95 | 100 | 100 |
| —CH$_3$ | 2-(—Cl) | 75 | 95 | 100 |

We claim:

1. Benzaldoxime derivative of the formula:

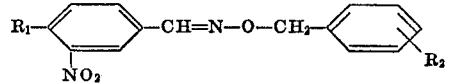

wherein $R_1$ represents hydrogen or alkyl of 1 through 3 carbon atoms and

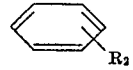

represents phenyl carrying one or two halogens.

2. The benzaldoxime derivative according to claim 1 wherein $R_1$ is hydrogen and $R_2$ is fluorine in the 3-position of the benzene ring.

3. The benzaldoxime derivative according to claim 1 wherein $R_1$ is methyl and $R_2$ is chlorine in the 2-position of the benzene ring.

4. The benzaldoxime derivative according to claim 1 wherein $R_1$ is hydrogen and $R_2$ is chlorine in the 3-position of the benzene ring.

5. The benzaldoxime derivative according to claim 1 wherein $R_1$ is hydrogen and $R_2$ is bromine in the 3-position of the benzene ring.

6. The benzaldoxime derivative according to claim 1 wherein $R_1$ is hydrogen and $R_2$ is fluorine in the 2-position of the benzene ring.

7. The benzaldoxime derivative according to claim 1 wherein $R_1$ is hydrogen and

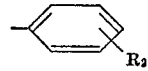

is 3,4-dichlorophenyl.

References Cited
FOREIGN PATENTS
964,721   7/1964   Great Britain ____ 260—566

LEON ZITVER, Primary Examiner

G. A. SCHWARTZ, Assistant Examiner

U.S Cl. X.R.

260—566A; 424—327